(12) United States Patent  
Binder

(10) Patent No.: US 7,063,308 B2
(45) Date of Patent: Jun. 20, 2006

(54) AIR SPRING RESILIENT MEMBER

(75) Inventor: Klaus Binder, Sarstedt (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 159 days.

(21) Appl. No.: 10/475,996

(22) PCT Filed: Apr. 22, 2002

(86) PCT No.: PCT/EP02/04398

§ 371 (c)(1),
(2), (4) Date: Oct. 27, 2003

(87) PCT Pub. No.: WO02/088571

PCT Pub. Date: Nov. 7, 2002

(65) Prior Publication Data
US 2004/0130080 A1    Jul. 8, 2004

(30) Foreign Application Priority Data
Apr. 27, 2001 (EP) .................................. 01110400

(51) Int. Cl.
*F16F 9/04* (2006.01)
(52) U.S. Cl. ................... 267/64.27; 267/64.24
(58) Field of Classification Search ............. 267/64.27, 267/64.23, 64.24, 64.19, 64.21
See application file for complete search history.

(56) References Cited

U.S. PATENT DOCUMENTS

| 3,319,952 A | * | 5/1967 | Travers ................... 267/64.27 |
| 3,403,603 A | * | 10/1968 | Turner ........................... 92/99 |
| 3,897,941 A | * | 8/1975 | Hirtreiter et al. ........ 267/64.24 |
| 4,763,883 A | * | 8/1988 | Crabtree .................. 267/64.27 |
| 4,954,194 A | * | 9/1990 | Crabtree ..................... 156/175 |
| 5,201,499 A | * | 4/1993 | Elliott et al. ............. 267/64.27 |
| 5,286,010 A | * | 2/1994 | Pahl et al. ............... 267/64.24 |
| 5,346,187 A | * | 9/1994 | Drescher ................. 267/64.11 |
| 5,566,929 A | * | 10/1996 | Thurow .................... 267/64.24 |
| 5,975,506 A | * | 11/1999 | Thurow et al. .......... 267/64.23 |

FOREIGN PATENT DOCUMENTS

| DE | 36 43 073 | 6/1988 |
| DE | 197 16 250 | 10/1998 |
| DE | 198 46 852 | 4/2000 |
| JP | 03 000337 | 3/1991 |
| JP | 03 194280 | 11/1991 |
| JP | 06 117733 | 8/1994 |

* cited by examiner

Primary Examiner—Robert A. Siconolfi
(74) Attorney, Agent, or Firm—Walter Ottesen

(57) ABSTRACT

An air spring rolling-lobe flexible member is made of elastomeric material and has at least two layers of intersecting reinforcement filaments. The reinforcement filaments are arranged in an essentially parallel manner to each other at an angle between 40° and 80° to the direction of the periphery of the rolling-lobe flexible member. At least one component quantity of the reinforcement filaments (1, 2) within one layer exhibits another strength compared to the remaining component quantity thereof.

6 Claims, 1 Drawing Sheet

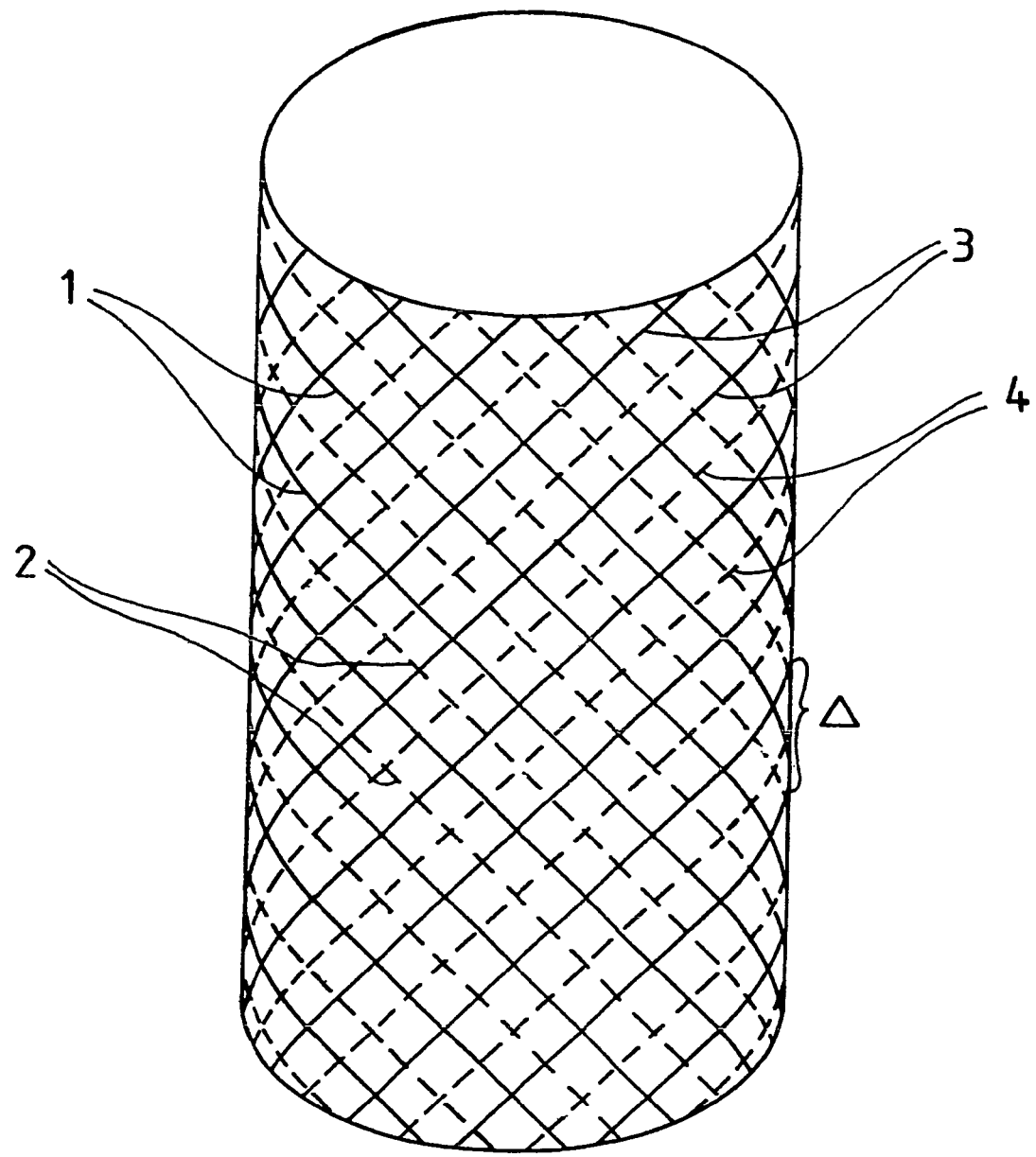

AIR SPRING RESILIENT MEMBER

FIELD OF THE INVENTION

This application is the national stage of PCT/EP02/04398, filed Apr. 22, 2002 designating the United States.

The invention relates to an air spring flexible member made of elastomeric material having at least two mutually crossing layers of reinforcement cords. The reinforcement cords are inclined at an angle of 40° to 80° to the peripheral direction of the flexible member and are arranged essentially parallel to each other within a layer.

Air springs have been proved advantageous to a large extent, for example, as vehicle springs, especially for spring mounting of the wheel axles of trucks and buses. In automobiles, the use of air springs is increasing significantly because they offer a balanced comfort at high level even for vehicle bodies which are of the sporty kind.

BACKGROUND OF THE INVENTION

An air spring has layers of reinforcement cords which run parallel and are embedded in rubber. These reinforcement cords are also known as reinforcement layers which take up the forces which arise because of the overpressure in the air spring flexible member. The reinforcement cords are, in general, so-called cord threads wherein several individual fibers (filaments) are twisted into a filament-shaped formation. The reinforcement threads preferably comprise full-synthetic fibers which exhibit a high capability of bending, strength and a uniform stretching capability. These fibers are made, for example, of polyester, polyamide or aramide and can also be made of metal.

In the usual method for producing air springs, the individual unvulcanized components of the air spring (inner rubber, reinforcement layers, outer rubber and, if required, wire cores) are wound or manufactured to an air spring blank and this blank is then vulcanized. In this method, as a rule, rubberized cord fabric layers are used for the reinforcement layers. The cord fabric comprises a plurality of parallel cord threads lying one next to the other and lying in the warp direction. The cord threads are loosely held together at greater spacings by a few thin threads in the direction of the weft. After an impregnation operation for increasing the adherence of rubber (fabric preparation), these cord fabrics are rubberized with a suitable rubber mixture, for example, a mixture on the basis of chloroprene rubber and, after the diagonal cutting into the wanted layer number, are so wound on the blank that the cords of the various layers come to rest crosswise, preferably, at a cord angle of 40° to 80° to the peripheral direction. With the cord angle, and for a given air spring contour, carrying force and lateral force of the air spring can be influenced.

Another method for manufacturing air springs is described, for example, in DE 198 46 852 A1. In this method, cord-reinforced tubular blanks are continuously manufactured by the spiral-formed wrapping of a coated mandrel with reinforcement cords. The tubular blanks comprise several layers and these blanks are, for example, tubular rolling-lobe flexible members for air springs. Overlapping regions and abutting regions are avoided with this method.

Newer developments of motor vehicles or chassis, especially in the automobile area, call for increasingly smaller air spring types having correspondingly increasing operating pressures. Especially high requirements are imposed on the layers of reinforcement cords in order to withstand these pressures, that is, to realize a highest possible bursting pressure while at the same time ensuring a high bending strength and therefore to ensure a high service life of the air springs. The number of layers may not be too great so that a high flexibility can be achieved. At the same time, the strength and the filament thickness of the reinforcement cords must be so selected that the air spring achieves a bursting pressure as high as possible. If the spacing of the cords becomes too great, then the danger is present that the rubber material is not sufficiently burst-tight and a point-for-point destruction of the air spring in the clear distances between cords could occur.

In U.S. Pat. No. 5,566,929, an air spring flexible member is described which exhibits a high stand time at high inner pressures and low roll-off radii in the rolling lobe. This rolling-lobe flexible member has, as a reinforcement layer, three rubberized cord fabric layers one atop the other. The middle cord fabric layer has a layer strength which corresponds to the sum of the layer strengths of the first and third layers. The fabric within one and the same layer comprises uniform cord filaments, that is, the cord filaments are made of the same material and have identical cord construction.

SUMMARY OF THE INVENTION

The present invention is based on the task of providing an air spring flexible member having an adequate bursting pressure and a high surface life which can be manufactured simply and cost effectively.

This task is solved in accordance with the invention in that at least one component quantity of the reinforcement filaments within a layer exhibit another strength than the remaining component quantity.

The basic idea of the invention is that, with the use of high strength reinforcement filaments, the filament spacing within a layer can be varied in dependence upon the required bursting pressure. However, it is to be noted for ever greater spacing, that the strength of the rubber material becomes a limiting factor for the air pressure in the air spring starting at a specific spacing between the filaments. In order to prevent that the rubber material in the region of the clear spacing between the high strength filaments is destroyed point-for-point, reinforcement filaments having a lower strength are distributed within the layer between the high strength reinforcement filaments so that these reinforcement filaments of lesser strength bridge the region of the clear distance between the filaments of higher strength. The flexibility of the wall of the flexible member and the spring characteristics are not affected by this measure and high stand times of the air spring are achieved.

With the introduction of reinforcement filaments of different strengths and therefore also a different rupture strain within a layer, the occurring elongation (rated elongation) in the normal loading case can furthermore shift to higher values compared to the elongation of a layer made of only high strength material. In this way, pressure stresses can be avoided and these pressure stresses can, for example, occur in the region of the rolling lobe in rolling-lobe flexible members and can contribute especially to the destruction of the rolling-lobe flexible member.

Air springs with the arrangement of the reinforcement filaments in accordance with the invention permit an uncomplicated manufacture in that, for example, cord fabric layers can be used in the conventional wrapping method wherein the cord filaments have different strengths. For example, hybrid fabrics (mixture fabric of different filaments) can be used wherein, in addition to the filaments made of the one material, also filaments of another material are present.

Likewise, air springs in accordance with the invention can be manufactured in accordance with a continuous method as described, for example, in DE 198 46 852 A1. Reinforcement filaments having different strengths are supplied by the warp creel to the positioning ring and the guide element. These reinforcement filaments are then placed on the coated mandrel.

The materials having a high strength which can be utilized for air springs are often more expensive than materials having lesser strength. For this reason, and depending upon the required bursting pressure, a portion of the expensive filaments can be replaced by filaments which are less expensive. The material costs can be optimized without difficulty in the air spring according to the invention.

The reinforcement filaments having the different strengths can be arranged within the layer in the most varied ways. Thus, i filaments of one strength can be disposed next to j filaments of another strength over the periphery of the air spring alternately, wherein: i=1,2,3 . . . and, independently thereof, j=1,2,3 . . . . For example, over the entire periphery of the air spring, always two filaments of high strength can be alternately placed next to one filament of lesser strength. Especially preferred is an arrangement wherein i and j assume the value 1 so that the reinforcement filaments alternate over the periphery of the flexible member and each of the reinforcement filaments of one strength are arranged next to the reinforcement filaments of the other strength. In this way, a very uniform distribution of the filaments is obtained which ensures excellent spring characteristics because stress differences in the wall of the flexible member remain low.

It is, however, also possible that certain regions (for example, half the periphery), exhibit a specific arrangement (for example, only filaments of high strength), whereas other regions exhibit a different arrangement (for example, filaments of high and low strength 1:1 in alternation). With this kind of distribution, one can, for example, manufacture curved air springs.

The more complicated the arrangement of the filaments having different strengths, the more suitable are methods for the manufacture of the air spring wherein the filaments of the layer can be individually supplied and wound on a coated mandrel. In a simple manner, these methods make possible the desired substitution of individual filaments of a layer with other filaments without it being necessary to make new fabrics or to apply the fabrics precisely cut and fitted.

The different strengths of the reinforcement filaments can be achieved, for example, by different filament diameters and/or different cord constructions of the filaments. The cord construction can differ, for example, by the number of the continuous fibers used, the direction of rotation and the number of twists. Different strengths of reinforcement filaments can also be achieved with the same basic material in that different pretreatment methods are utilized for the manufacture of the reinforcement filaments.

It is, however, especially advantageous when the different strengths of the reinforcement filaments are achieved with the use of different materials. For different strengths, the filaments can then be configured the same in their construction and their diameters so that the layers are very uniform in their outer configuration and, during roll-off operations, for example, no raised regions can lead to changes of the wear behavior or bending behavior.

For example, individual fibers or cords of polyamide, polyester, aramide or rayon can be used as reinforcement filaments for the air spring.

According to an advantageous embodiment of the invention, the reinforcement filaments with higher strength are aramide filaments. Aramide filaments combine high strength with high module, excellent dimensional stability and resistance to heat. As aramides, for example, copolymerizates of essentially terephthalic acid and p-phenylenediamine (para-aramide), for example, Kevlar® or Twaron® can be used as well as copolymerizates of essentially m-phenylenediamine and isophthalic acid (meta-aramide), for example, Nomex®. However, additional monomers can also be polymerized in the copolymerizates. Accordingly, terpolymerizates of terephthalic acid, p-phenylenediamine and additional monomers, for example, Technora® can be used.

The reinforcement filaments with lesser strength are advantageously polyamide filaments, for example, nylon or polyester filaments. These filaments are cost effective and their strength is sufficient for bridging the distances between the filaments of higher strength.

Air spring flexible members of the invention can be bellows, half bellows or rolling-lobe flexible members. The air spring flexible members are also especially suitable for small bending radii, which must be run through many times in the roll-off zone in rolling-lobe flexible members. Furthermore, with the arrangement of the reinforcement filaments of different strengths and therefore also a different structure elongation in the wall of the flexible member, one can achieve that the expansion or elongation, which occurs in the case of a load, is greater in comparison to the elongation when utilizing only high strength reinforcement filaments. In rolling-lobe flexible members, the development of pressure stresses in the region of the rolling lobe can therefore be avoided. These pressure stresses can lead to the destruction of the air spring flexible member.

In the following the invention will be explained in greater detail with respect to an embodiment in connection with the accompanying FIGURE without being limited to this example.

BRIEF DESCRIPTION OF THE DRAWING

In the following, the invention will be explained in greater detail with respect to an embodiment in connection with the accompanying figure without being limited to this example.

DESCRIPTION OF THE PREFERRED
EMBODIMENTS OF THE INVENTION

The figure shows how the reinforcing filaments 1, 2, 3, 4 run in an air spring of the invention having two mutually crossing reinforcement layers. These reinforcement filaments 1, 2, 3, 4 are completely surrounded by an elastomeric material (not shown in the figure) in the finished air spring. The filaments 1 and 2 form the inner layer and the filaments 3 and 4 form the outer layer. The filaments 1 and 3 are filaments having a higher strength, such as aramide filaments, which are arranged within a layer at a spacing Δ. Between each two aramide filaments 1, there is a filament 2 of lesser strength, for example, a filament made of polyamide or polyester and between each two aramide filaments 3 there is a filament 4 having lower strength, for example, of polyamide or polyester. In the finished product, the filaments (2, 4) reinforce the rubber material disposed between the filaments (1, 3) to a sufficient amount and prevent the point-for-point destruction (rupturing of the rubber) in these regions under the operating pressures which are present. These air springs can, on the one hand, be manufactured in that corresponding hybrid fabric can be used in the wrapping method and, on the other hand, the air spring can be manufactured from a continuously produced tubular blank when the air springs are air springs having a tubular rolling-lobe flexible member. In the production of the tubular blank, the different reinforcement filaments can be supplied via a warp creel.

What is claimed is:

1. An air spring flexible member of elastomeric material, the air spring flexible member having an annular configuration defining a peripheral direction and comprising:
    at least two mutually crossing layers of reinforcing filaments with the reinforcing filaments being inclined at an angle of 40° to 80° to said peripheral direction of said flexible member and being arranged essentially parallel to each other within a layer; and,
    at least a first component quantity of the reinforcement filaments within at least one of said layers having a strength different from the strength of the remaining component quantity of reinforcement filaments in said one layer.

2. The air spring flexible member of claim 1, wherein the reinforcement filaments of said first component quantity alternate over the periphery of the flexible member with the reinforcement filaments of said remaining component quantity so that a reinforcement filament of one strength lies next to a reinforcement filament of the other strength.

3. The air spring flexible member of claim 1, wherein the different strengths of the reinforcement filaments are achieved by utilizing different materials.

4. The air spring flexible member of claim 1, wherein the reinforcement filaments having a higher strength are aramide filaments.

5. The air spring flexible member of claim 1, wherein the reinforcement filaments having lesser strength are polyamide filaments or polyester filaments.

6. The air spring flexible member of claim 1, wherein the air spring flexible member is a rolling-lobe flexible member.

* * * * *

UNITED STATES PATENT AND TRADEMARK OFFICE
CERTIFICATE OF CORRECTION

PATENT NO. : 7,063,308 B2  Page 1 of 1
APPLICATION NO. : 10/475996
DATED : June 20, 2006
INVENTOR(S) : Klaus Binder It is certified that error appears in the above-identified patent and that said Letters Patent is hereby corrected as shown below:

In column 1:
Line 3: delete "FIELD OF THE INVENTION".
Between lines 6 and 7: insert -- FIELD OF THE INVENTION --.
Between lines 12 and 13: insert -- BACKGROUND OF THE INVENTION --.
Line 20: delete "BACKGROUND OF THE INVENTION".

In column 4:
Delete lines 44 to 46 and substitute -- The single figure shows, schematically, an arrangement of reinforcement filaments in the center region of an air spring rolling-lobe flexible member. -- therefor.

Signed and Sealed this

Twenty-second Day of May, 2007

JON W. DUDAS
*Director of the United States Patent and Trademark Office*